United States Patent

Moritan et al.

[11] Patent Number: 5,822,846
[45] Date of Patent: Oct. 20, 1998

[54] METHOD OF MANUFACTURING A DISK DRIVE SPINDLE MOTOR

[75] Inventors: Norishige Moritan, Saihaku-gun; Akihide Matsuo; Hideshi Fukutani, both of Yanago, all of Japan

[73] Assignee: Matsushita Electric Industrial Co., Ltd., Osaka-fu, Japan

[21] Appl. No.: 923,475

[22] Filed: Sep. 4, 1997

Related U.S. Application Data

[62] Division of Ser. No. 744,899, Nov. 8, 1996, Pat. No. 5,715,116, which is a continuation of Ser. No. 405,571, Mar. 16, 1995, abandoned, which is a continuation of Ser. No. 125,449, Sep. 22, 1993, abandoned.

[30] Foreign Application Priority Data

Mar. 15, 1993 [JP] Japan .............................. HEI 5-053396

[51] Int. Cl.$^6$ .................................................. H02K 15/04
[52] U.S. Cl. ........................... 29/598; 29/603.03; 310/90; 360/98.08; 360/99.08; 384/115; 384/120
[58] Field of Search ................................ 29/603.03, 598; 360/98.08, 99.08; 310/90; 384/114, 115, 120

[56] References Cited

U.S. PATENT DOCUMENTS

| | | |
|---|---|---|
| 3,449,028 | 6/1969 | DeHart . |
| 4,547,081 | 10/1985 | Tanaka et al. . |
| 4,557,610 | 12/1985 | Asada et al. . |
| 5,018,881 | 5/1991 | Asada . |
| 5,141,338 | 8/1992 | Asada et al. . |

FOREIGN PATENT DOCUMENTS

| | | |
|---|---|---|
| 0 104 266 | 6/1984 | European Pat. Off. . |
| 01 04266 | 2/1962 | Italy . |
| 58-5518 | 1/1983 | Japan . |
| 60-78106 | 5/1985 | Japan . |
| 3-84214 | 4/1991 | Japan . |
| 4-181012 | 6/1992 | Japan . |

*Primary Examiner*—Carl E. Hall
*Attorney, Agent, or Firm*—Panitch Schwarze Jacobs & Nadel, P.C.

[57] ABSTRACT

In a spindle motor for a driving a memory disk, a is closed space formed by a sleeve metal, an end portion of a shaft and a thrust plate. The closed space is connected to outside open space by a connection path, thereby effectively discharging undesirable air in an assembling stage.

2 Claims, 10 Drawing Sheets

METHOD OF MANUFACTURING A DISK DRIVE SPINDLE MOTOR

This is a division of application Ser. No. 08/744,899, filed Nov. 8, 1996, which is a continuation of application Ser. No. 08/405,571 filed Mar. 16, 1995, now abandoned, which is a continuation of application Ser. No. 08/125,449 filed Sep. 22, 1993, now abandoned.

FIELD OF THE INVENTION AND RELATED ART STATEMENT

1. Field Of The Invention

The present invention relates to an improvement in a spindle motor for driving a memory disk such as a flexible magnetic disk or hard magnetic disks for use in information processing field and method for assembling the spindle motor.

2. Description Of The Prior Art

In recent years, memory disk driving apparatus have improved so as to have smaller size, with size reductions and resultant high integration of its component devices. Among such memory disk drive apparatus, those characterized as portable property, specially requires particular smallness of size, shock-proof ability, low-noise property and low power consumption. It is natural that the spindle motor for driving the memory disk provided therein is requested of the same matters.

A key-components which determine the above-mentioned properties are bearings of the spindle motor. Hitherto, roll bearings have been used generally for the memory disk driving motor. But in order to correspond to higher demand for the above-mentioned requirements, dynamic pressure type fluid bearings are attracting attention and are being adopted more and more. The dynamic pressure fluid bearing is configured with a cylindrical shaft and a metal sleeve having a cylindrical hollow space so as to fit on the cylindrical shaft with a very small gap inbetween. On either of the outer surface of the cylindrical shaft or the inner surface of the metal sleeve, shallow grooves of herringbone pattern are formed. The very narrow gap between the cylindrical shaft and the sleeve is filled with a lubricant of machine oil or grease. Thereby as the motor rotates, dynamic pressures are generated at each V-shaped peak of the herringbone pattern grooves, and therefore the dynamic pressure slidably bears the sleeve or shaft in relation to the others. This type of dynamic pressure fluid bearing is splendid in its smallness of volume of mechanism, quietness of sound at rotation, shock resistive property, and smallness of radial vibration due to bearing of the mechanical load by the whole opposing surfaces of the cylindrical shaft and the inner surface of the sleeve filled with the lubricant. Therefore, it is theoretically splendid as radial bearings for the memory disk driving apparatus. However, the above-mentioned dynamic pressure fluid bearing itself does not have an ability as a thrust load bearing, and hence the conventional dynamic pressure fluid bearing for the memory disk driving apparatus has used another thrust bearing.

Among various types of the thrust bearing, a concise and frequently used configuration comprises a thrust plate and a point contacting top face of the shaft. There have been some improvements in the thrust bearing such as having pivot type configuration or having spiral grooves to generate a dynamic pressure of oil thereby.

Since the magnetic disk driving apparatus, especially of portable type, is preferably as small as possible in its thickness or height, the motor used therein has a limited height in the direction of the motor shaft. On the other hand, the height of a radial bearing should preferably be a large height in the direction of the shaft; and hence, the height occupied by the thrust bearing part of the motor should be as small as possible. In order to correspond to this demand, in the fixing of the thrust plate to the motor, instead of height-taking configuration of screwing or bolt-fastening, more height saving configurations are usually adopted, for instance, caulking, pressing-in, bonding by adhesive or welding, or integration of the thrust plate with a sleeve metal of the bearing.

In these configurations, generally it is necessary to fix the thrust plate at the end of the sleeve metal prior to the inserting of the shaft into the sleeve metal of the bearing, in order to achieve a precise assembling. The reason is that after the shaft has been inserted in the bearing sleeve, it is difficult to keep a precise positional relation between the thrust plate and the bearing sleeve while holding the load weight on the components of the bearing.

In the dynamic pressure fluid bearing such as the one comprising the aforementioned herringbone grooves, there is an important problem to be solved for assembling it. This problem is that an insertion of the shaft into the bearing sleeve is very much difficult when a lubrication fluid, for instance, machine oil, is preliminarily supplied in the bearing sleeve and a certain amount of air is confined in a closed space formed in the bottom end part of the bearing sleeve, the bottom end of the shaft and the thrust plate. Unless being provided with some measure to solve the above-mentioned air confinement in the closed space, the assembling of the motor with a controlled quality is impossible.

Next important problem to be solved in such type motor is the countermeasure against bubble or foam generated in the lubricant accompanied to the rotation of the motor. In the dynamic pressure fluid bearing, wherein its rotor is rotatably and smoothly held by the dynamic pressure generated with the rotation, an overload may arise depending on the operating condition, thereby inducing an overheating of the lubricant. Such an overload sometimes generates undesirable bubbles in the bearing. Once such bubbles are generated in the bearing, that part loses load holding ability; and thereby preciseness of rotation of the rotor is decreased and the lubrication ability is lowered; and further, the service life time of the motor is much shortened resultantly. Therefore, the undesirable bubbles in the closed space of the bearing must be discharged quickly.

In order to solve the problem, the present invention proposes an improved configuration for discharging the confined air from the bearing. And besides this, the invention also proposes further configurations for pre venting undesirable secondary reactions of the above-mentioned mechanism, such as contamination and run of the lubricant by leakage thereof from the bubble discharging ports. In the magnetic disk driving apparatus, which is the typical embodiment using the spindle motor of the present invention, the memory disk with the magnetic information memory layer must be kept in an extremely clean space. That is, any polluting particles must not be discharged onto the surfaces of the memory disk, which is driven by the spindle motor. In the prior art of U.S. Pat. No. 4,557,610, the air or bubble discharge ports are not provided with a pollution-preventive filtrating devices.

SUMMARY AND OBJECT OF THE INVENTION

In order to solve the aforementioned problems on the small height type spindle motor to be used in driving the memory disk and effectively discharge the air or bubble from the dynamic pressure fluid configuration, the present invention purports to provide an improved novel configuration of motor bearing apparatus, for effectively discharging an undesirable air in an assembling stage, and discharging undesirable bubbles produced by overload or the like causes, as well as for effectively preventing pollution by oil mist to the related apparatus. The invention thereby intends to enable the spindle motor for driving the memory disk to acquire desirable properties of small size, small height in the direction of the motor shaft, low noise operation, low power consumption, rather simple configuration and low cost.

A first type one of spindle motor for driving memory disk in accordance with the present invention comprises:

a rotor for carrying and driving at least one memory disk (105), at least one radial type dynamic pressure fluid bearing including a shaft (12), a sleeve metal (21) rotatably fitting on the shaft and a predetermined amount of lubricant therebetween, either of the outer face of the shaft (12) or the inner face of the sleeve metal (21) having at least one herringbone-pattern groove for producing the dynamic pressure, and a thrust bearing (12b+22) including a thrust plate (22) disposed at one end of the sleeve metal (21) for abutting the end portion of the shaft (12) and a predetermined amount of oil confined in a closed space (21') which is formed by the sleeve metal (21), the end portion of the shaft (12) and the thrust plate (22) and has a connection path (23b) to outside open space.

A rotor for carrying and driving at least one memory disk, at least one radial type dynamic pressure fluid bearing including a shaft, a sleeve metal rotatably fitting on the shaft and a predetermined amount of lubricant therebetween, either of the outer face of the shaft or the inner face of the sleeve metal having at least one herringbone-pattern groove for producing the dynamic pressure, and a thrust bearing including a thrust plate disposed at one end of the sleeve metal for abutting the end portion of the shaft and a predetermined amount of oil confined in a closed space which is formed by the sleeve metal, the end portion of said shaft and the thrust plate and has a connection path to outside open space.

While the novel features of the invention are set forth particularly in the appended claims, the invention, both as to organization and content, will be better understood and appreciated, along with other objects and features thereof, from the following detailed description taken in conjunction with the drawings.

In more concrete aspect, there are such various species as:

(i) a through hole is bored in the sleeve metal in a direction parallel with the axis of the rotor shaft, thereby to make connection from the thrust bearing part to outside open space, (ii) a through hole or gap is formed between the sleeve metal and its outside housing, thereby to make connection from the thrust bearing part to outside open space, (iii) the sleeve metal is configured by two pieces of liners each having herringbone grooves, and a gap is formed between them and a housing outside thereof, (iv) one or more vertical (parallel to the axis of the rotor shaft) grooves are formed between the inside face of the sleeve and the cylindrical face of the shaft, or (v) one herringbone groove is formed particularly deeper than others and this deep groove is used as a connection groove from the thrust bearing part to outside open space.

In a further specified mode, at the open end side of the sleeve, such a filter is provided that which comprises; (i) an oil reservoir space for storing lubricant oil drops which are put out together with air and on the other hand traps foreign matters, which are for prolonging service period of lubrication and prevent contamination to the apparatus, and (ii) a filter means for selectively passing volatile oil or gaseous molecules.

A second type one of spindle motor in accordance with the present invention features in that, in order to prevent air choking due to liquid matter in gaps in a bearing, lubricant liquid is injected into the bearing assembly after insertion of its shaft. Main item of this type apparatus is the problem that in what way the lubricant liquid is to be filled in the bearing gap space after the insertion of the shaft. First, a liquid reservoir space for a sufficient volume of liquid is provided in an adjacent position to the end of the open end side of the sleeve, for storing the lubricant liquid to be filled. In this space, the lubricant may be filled preliminarily to the insertion of the shaft, or alternatively, the lubricant may be filled later from outside. Then, the assembly is put in a vacuuming chamber after the insertion of the shaft, and then the lubricant is made fill into the bearing gap by utilizing one or more of the ways: (i) the air in the bearing gap is replaced by the lubricant, (ii) the assembly is heated in order to decrease viscosity and wet angle of the lubricant, thereby to make the lubricant come into the bearing gap, and (iii) the shaft is held tilted contacting the lubricant, thereby making the lubricant come into the assembly by capillary action.

Furthermore, the lubricant filling method utilizing the negative pressure can be applied also to the bearing of the first type one which has an air discharging groove.

The motor of the above-mentioned configuration is featured by that on a member such as a hub which is fixed on an end of the bearing has a hole or a recess so that the lubricant can be supplied to the open end part of the sleeve metal or a sufficient amount of the lubricant can be stored at the open end of the sleeve.

A third type one of the spindle motor in accordance with the present invention features in that a vertical hole, which is substantially parallel to the axis of the motor shaft, is bored in the shaft so as to connect the thrust bearing part and the outside space. The vertical hole is preferably bored at a part of relatively low pressure at the rotation of the shaft, for instance, at a part relatively close to the surface of the shaft than on the axis of the shaft. Furthermore, by providing a filter which passes only the air at a part near the outlet from the vertical hole to the outside of the shaft, leakage of the lubricant mist from the air outlet can be prevented.

A fourth type one of spindle motor in accordance with the present invention features in that an air discharge hole for the air from bearing space is provided on the side of the thrust plate, and a filter is also used to prevent leakage of the lubricant mist from the discharging hole. The filter may be provided in the hole, or alternatively may be provided to cover the outside opening of the hole of the thrust plate at the outside. The discharging hole is preferably bored at a part of relatively low pressure similarly to the previous type one, for instance, at a part relatively close to the surface of the shaft than on the axis of the shaft.

Words and wordings used in this disclosure will be described. Sleeve metal designates a tubular bearing cylinder which bears the radial load of shaft, and in general an alloy of copper is suitable therefor, but not limited thereto. Herringbone groove may be formed on either of the inside surface of the sleeve metal or the surface of the shaft. The thrust plate is the member which faces and contacts the thrust end of the shaft to receive the thrust load, and in case of the thin type spindle motor for driving the memory disk, this member is of course a plate shaped member and hence is herein called the thrust plate in the disclosure. Depending on the demanded designs and configuration of the related parts in the surroundings, however, the thrust member may be modified to other shapes than plate, for instance, to the shapes of a block, cup, etc. Herein, these thrust members are also included in the meaning of the thrust plate. Air discharging groove and air discharging holes similarly include modified parts or construction, as far as they perform the functions of discharging air or bubble from the confined or closed space. The vertical groove and vertical hole are also used in the disclosure intending to imply substantially vertical ones, therefore they are not necessarily straight, but may be spiral, zig-zag, and the like shape as far as their outline shape is vertical or substantially parallel to the shaft axis. The groove may be formed on either of the each-other opposing faces of two members, and air discharging function of the groove is substantially equal irrespective of either face on which the groove is formed, and the scope of the present invention covers cases of both faces.

According to the present invention, in the spindle motor of the first type, the air confined in the space in the bearing is discharged to the outside space by the air discharging connection path from the closed space to the open end part of the sleeve metal. In this first type configuration, the output end of the connection path or air discharging connection path is open still inside of the motor, that is, the air discharging connection path does not directly connect the inside closed space and the outside space. Therefore, unnecessary confined air can be discharged, protecting the inside of the apparatus from contamination by dusty air outside the apparatus. Therefore, this type of motor is most suitable for the memory disk driving apparatus which requires a very high degree of cleanness.

In the spindle motor of the second type, the insertion of the shaft into the sleeve is carried out in the state where there is no oil or grease in order to evade difficulty of the insertion work. This type is suitable for such cases that there is no need of particular consideration on discharging of bubbles which are generated during the operation. This type is characterized and is advantageous in that the bearing assembling can be made in a dry state, wherein the insertion of the shaft is easy because there is no air confinement in the bearing part.

In the spindle motor of the third type, the air confined in the closed space in the bearing is discharged through a connection hole bored through the shaft.

In the spindle motor of the fourth type, the confined air is discharged through a discharge hole bored on the thrust plate.

In the third type, the connection hole rotates with the rotation of the shaft; while in the fourth type, the connection hole is fixed still directly connecting to the outside space. The third type, wherein the connection hole does not connect to outside, resembles somewhat to the first type. This type should preferably be provided with a filter, since the lubricant might leak into the disk memory driving apparatus. Even in the case of directly connecting to the open space outside the disk memory driving apparatus, a provision of filter results in protection of oil contamination of the outside of the apparatus. In these types of configuration, such method can be adopted as to inject the lubricant liquid through the connection hole after finishing of shaft insertion and assembling of the motor.

The aforementioned object and purpose of the present invention can be achieved and the aforementioned problems can be solved by selectively adopting the aforementioned various air discharging configurations depending on modes and characteristics demanded for the memory disk driving apparatuses.

As summarized in the above-mentioned paragraphs, the present invention can provide apparatuses that can solve the problems of discharging of the confined air in the assembling, discharging of the bubbles of oil generated to be during the operation and prevention of contamination by oil of the related apparatus. And the advantage of solving the above-mentioned problem is especially superior when the configuration of the invention is applied to thin type electric motors wherein height occupied by the thrust bearing part must be decreased.

DESCRIPTION OF FEE PREFERRED EMBODIMENT

Hereafter, preferred embodiments of the present invention are described with reference to the accompanying drawings.

FIRST EXAMPLE

Figure 1A:
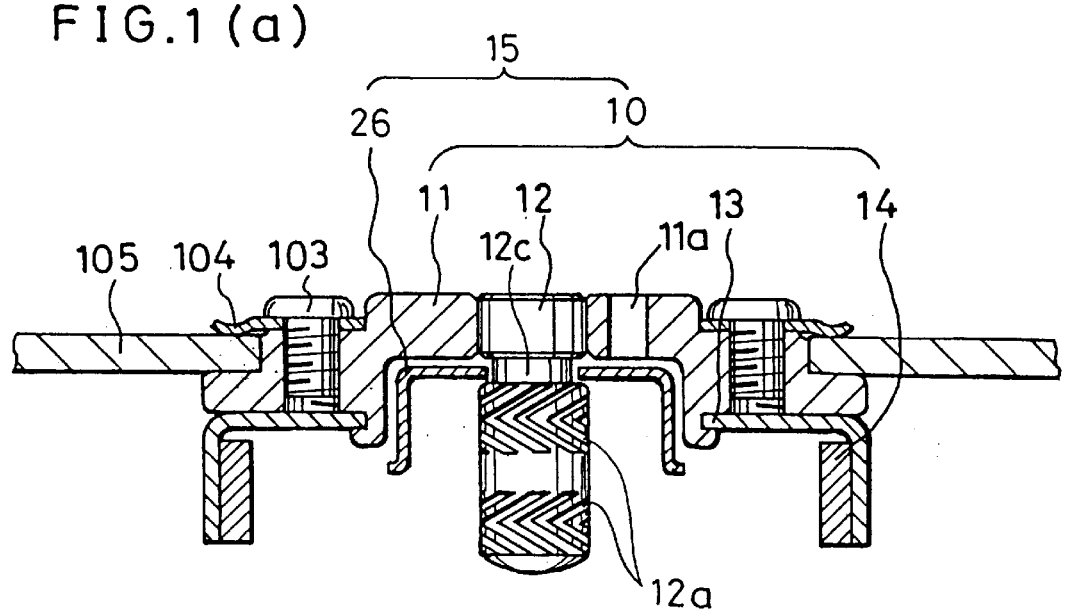
FIG. 1(a) is a sectional view showing an upper assembly of a first embodiment of a spindle motor in accordance with the present invention.
Figure 1B:
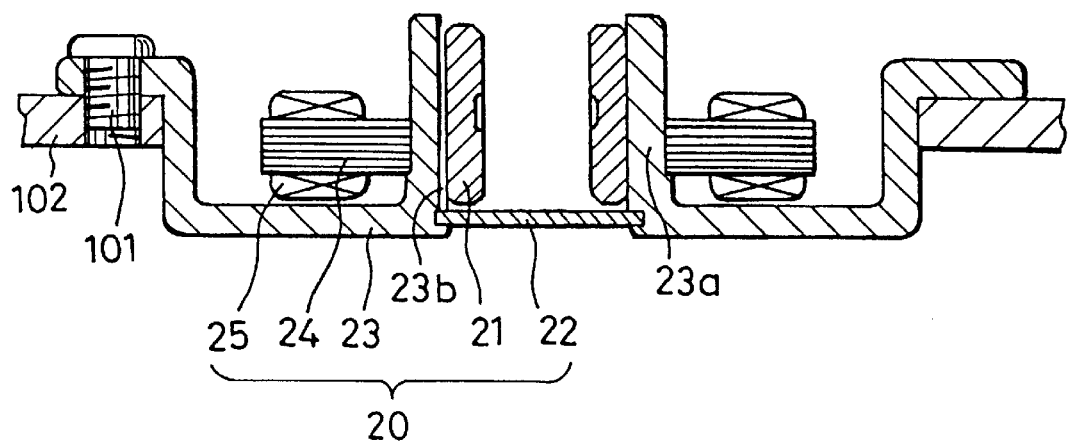
FIG. 1(b) is a sectional view showing a lower assembly of the first embodiment of the spindle motor in accordance with the present invention.
Figure 1C:
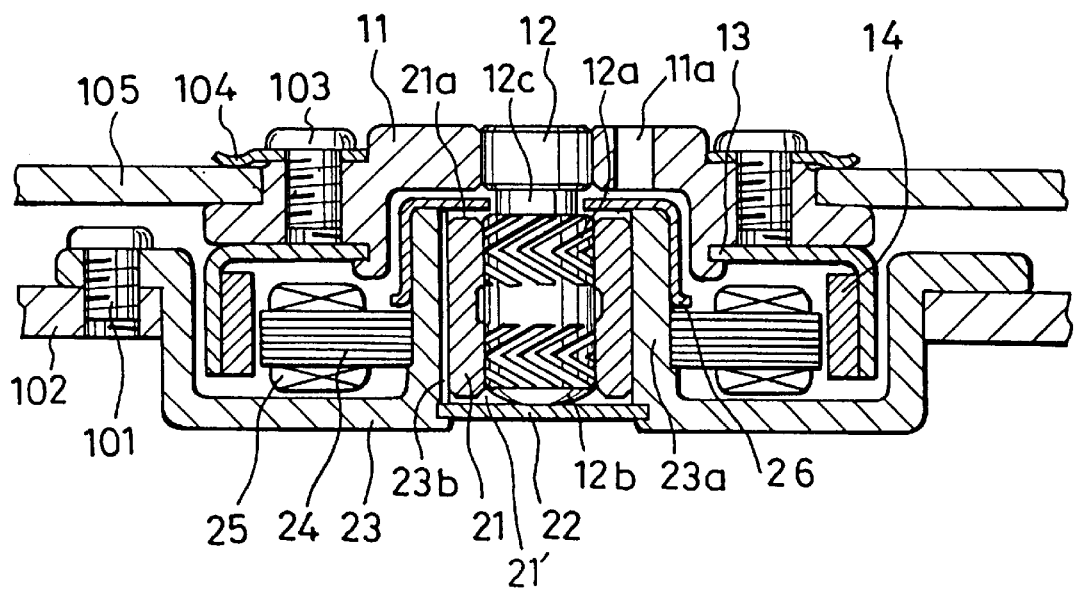
FIG. 1(c) is a sectional view showing the first embodiment of a constitution of the spindle motor in accordance with the present invention.
Figure 1D:
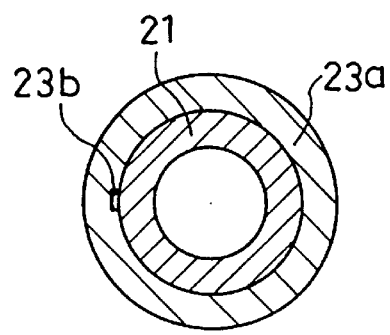
FIG. 1(d) is a partially cutaway view, which is a transverse cross section of FIG. 1(c), showing a radial bearing of the first embodiment of the spindle motor in accordance with the present invention.

FIG. 1(a)–FIG. 1(d) show a spindle motor with a part of a circumferential motor apparatus which is a first embodiment of the invention. This embodiment belongs to the above-mentioned first group. In FIG. 1(c), the spindle motor is fixed on a base 102 of the motor apparatus by plural bolts 101, and sets a memory disk 105 by means of plural bolts 103 and a known cramp ring 104 on a hub 11 for driving rotationally thereby.

The constitution of this embodiment is described with respect to the function in the below-mentioned lines. At the center of the hub 11, on which the memory disk 105 is mount, a shaft 12 is fitted, and the shaft 12 drives the hub 11 and the disk 105 rotationally. The shaft 12 is shaped cylindrical and borne in the radial direction by a sleeve metal 21, and in the thrust direction by a thrust plate 22. Lubricant, such as machine oil or grease, is filled in a very narrow first gap, which is formed between the shaft 12 and the sleeve metal 21 and a very narrow second gap, which is formed between the shaft 12 and the thrust plate 22. On the outer surface of the shaft 12, known shallow grooves of herringbone-pattern are formed. Thereby when the spindle motor rotates, in the radial direction of the shaft 12, dynamic pressures are generated at each V shaped peaks of the herringbone-pattern groove 12a, and a dynamic pressure fluid bearing is constituted. On the other hand, in the thrust direction of the shaft 12, a shaft bottom face 12b and the thrust plate 22 constitute a thrust bearing, where abrasion is prevented by the lubricant which is filled in the very narrow second gap between the shaft bottom face 12b and the thrust plate 22.

The rotational driving force of a spindle motor is generated by a rotational magnetic field, which is formed by an excitation of stator core 24 and a stator coil 25. The stator core 24 and the stator coil 25 constitute an stator. By electrifying the stator coil 25 wound around the stator core 24, a rotational magnetic field is made, and the rotational magnetic field acts on a multi-pole driving magnet 14 disposed circumferentially around the stator core 24. A rotor assembly 10 has multi-pole driving magnet 14, a rotor frame 13 and the hub 11, and they rotate together. The multi-pole driving magnet 14 is fixed on the inner cylindrical wall of the rotor frame 13, and the rotor frame 13 is fixed on the hub 11. The stator core 24 is fixed on a bracket 23 and gives the rotational driving force to the rotor assembly 10.

Further details of the spindle motor is described by explaining the assembling method of a spindle motor, in the following.

Among a stator assembly, the stator core 24, which is preliminarily wound on the stator coil 25, is fixed at the bracket 23 by known press-fit process. Then, the sleeve metal 21 is fit in and fixed on the inner wall of a hollow cylinder 23a at the center of the bracket 23. (Hereinafter, the hollow cylinder 23a is called "housing") Subsequently, the thrust plate 22 is fixed at the bottom face of the housing 23a by means of caulking. Instead of the caulking, press-fit can be applied. Thus, a lower assembly 20 is worked up.

Among the rotor assembly 10, upper part of the shaft 12 is firmly fixed at the center hole of the hub 11 by means of shrinkage fit. Then, the inner circular face of the rotor frame 13 is fit on a fastening convex of the hub 11, and is firmly fixed by means of caulking. Further, multi-pole driving magnet 14 is fixed at the inner surface of the rotor frame 13 by means of adhesive. Subsequently, the cap 26 is inserted from the lower end side of the shaft 12, and the inner edge of the circular hole of the cap 26 is loosely placed in a groove 12c of the shaft. Thus, an upper assembly 15 is worked up.

Then, a predetermined quantity of the lubricant is injected into the inner part of the sleeve metal 21 of the lower assembly 20. And then, the lower end side of the shaft 12 of the upper assembly 15 is inserted into the hole of the sleeve metal of the lower assembly 10. At this time, inner wall of the cylindrical part of the cap 26 is designed to have some shrink range against the outer wall of the housing 23a. Therefore the cap 26 can be smoothly pushed so that the lower face of the top part of the cap 26 touches the upper end of the housing 23a, when the upper face of the top part of the cap 26 is pushed down by a pushrod (not shown) which is to be inserted downwards through three ports 11a on the hub 11 for assembling work. Thus, the assembling of the upper assembly 15 and the lower assembly 10, hence, of the whole spindle motor is worked up.

Hereupon, a connecting groove 23b is formed either on the inner wall of the housing 23a or the outer wall of the sleeve metal 21. In this example of FIG. 1(b), the groove 23b is engraved on the inner wall of the housing 23a. Air in the sleeve metal 21 is discharged through the connecting groove 23b, without confinement in a closed space 21' formed in the bottom end part of the bearing sleeve, the bottom of end part of the shaft 12 and the thrust plate 22, when the shaft 12 is inserted into the sleeve metal 21. Therefore, it is possible to assemble the spindle motor smoothly. Since the lubricant might be sometimes discharged together with the air discharged from this connecting groove 23b during insertion of the shaft 12, a space 21a of predetermined volume, which is enough for storing such lubricant, is disposed above the upper end side 21a of the sleeve metal 21. This space 21a stores the lubricant and hence prevents the lubricant from dispersing around the open end of the connecting groove 23b.

SECOND EXAMPLE

Figure 2A:
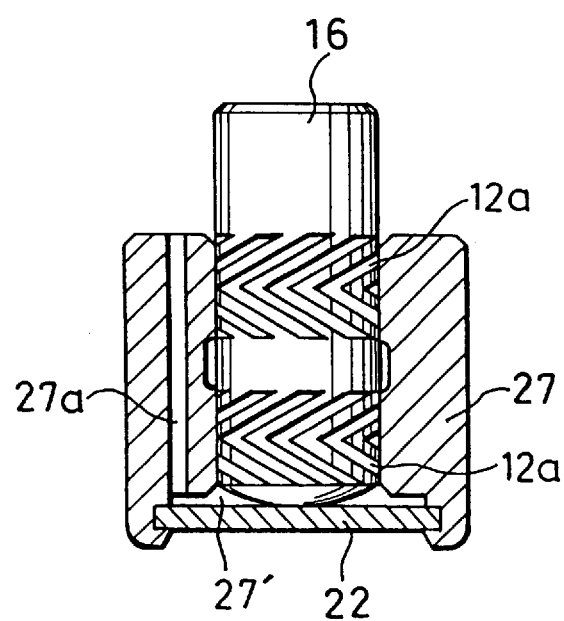
FIG. 2(a) is a partially sectional view showing a bearing of a second embodiment of a spindle motor in accordance with the present invention.
Figure 2B:
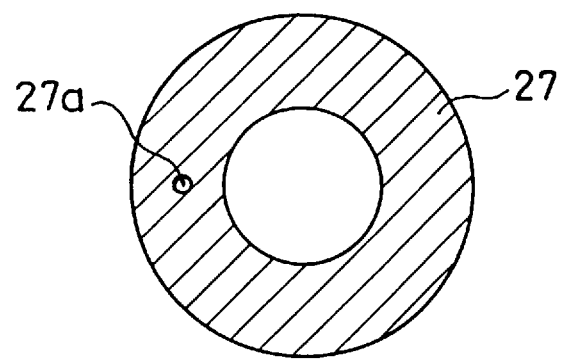
FIG. 2(b) is a partially cutaway view, which is a transverse cross section of FIG. 2(a), showing a radial bearing of the second embodiment of the spindle motor in accordance with the present invention.

FIG. 2(a) and FIG. 2(b) show a bearing of a spindle motor which is a second embodiment of the invention. This is an example in which a through hole 27a is bored at a sleeve metal 27. In FIG. 2(a) and FIG. 2(b), the same components and parts as those of the first embodiment are designated by the same numerals and the corresponding descriptions similarly apply.

The through hole 27a is bored in the sleeve metal 27 in parallel with the center axis of the sleeve metal 27, and the thrust plate 22 is fixed at one the bottom end face of the sleeve metal 27, and a shaft 16 is borne so as to bear the radial direction force by the sleeve metal 27, and the thrust direction force by the thrust plate 22. Furthermore, the through hole 27a connects to the inner bottom space 27' of the sleeve metal 27 close to the thrust plate 22.

THIRD EXAMPLE

Figure 3A:
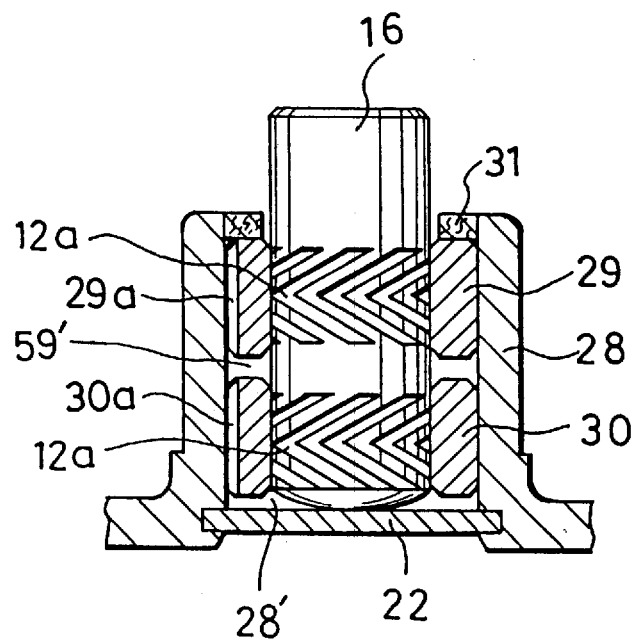
FIG. 3(a) is a partially sectional view showing a bearing of a third embodiment of a spindle motor in accordance with the present invention.
Figure 3B:
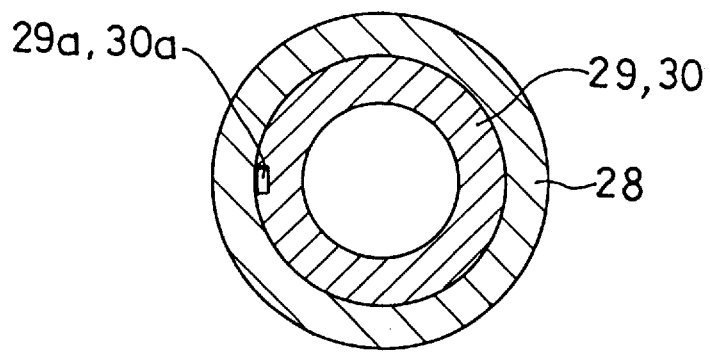
FIG. 3(b) is a partially cutaway view, which is a transverse cross section of FIG. 3(a), showing a radial bearing of the third embodiment of the spindle motor in accordance with the present invention.

FIG. 3(a) and FIG. 3(b) show a bearing of a spindle motor which is a third embodiment of the invention. This is an example in which sleeve metals 29, 30 are divided into two parts. In FIG. 3(a) and FIG. 3(b), the same components and parts as those of the first embodiment are designated by the same numerals and the corresponding descriptions similarly apply.

Connecting grooves 29a, 30a are formed on the outer wall of two sleeve metals 29a, 30 which are fit fixedly on the inner wall of a housing 28. By this configuration, it is possible that not only a space 28' adjacent to thrust but also a space 59' between the shaft 16 and two sleeve metals 29, 30, which is a dynamic pressure generation part, are connected to the open air. Furthermore, in this example, a filter 31 is provided on the upper end side of the sleeve metal 29. This filter 31 prevents the lubricant from dispersing out of the upper end of the connecting grooves 29a, 30a into outside air.

FOURTH EXAMPLE

Figure 4:
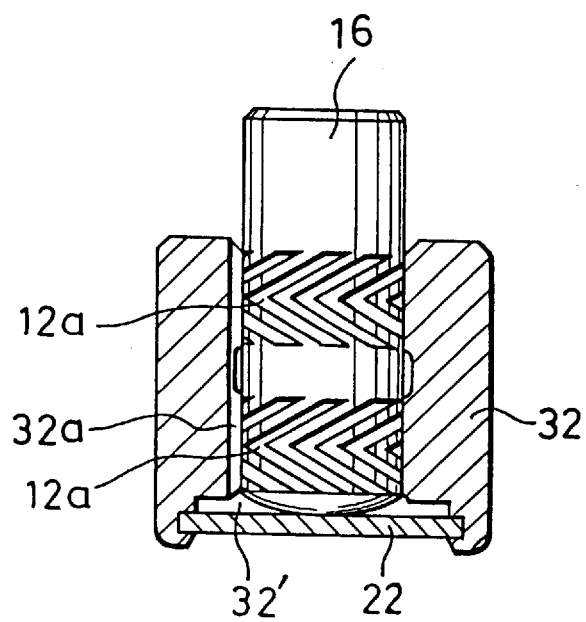
FIG. 4(a) is a partially sectional view showing a bearing of a forth embodiment of a spindle motor in accordance with the present invention.
FIG. 4(b) is a partially cutaway view, which is a transverse cross section of FIG. 4(a), showing a radial bearing of the forth embodiment of the spindle motor in accordance with the present invention.
Figure 4:
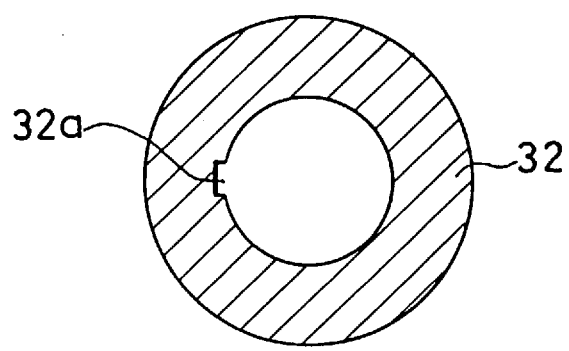

FIG. 4(a) and FIG. 4(b) show a bearing of a spindle motor which is a forth embodiment of the invention. This is an example in which a connecting groove 32a is formed on the inner wall side of a sleeve metal 32 for connecting to the open air. In FIG. 4(a) and FIG. 4(b), the same components and parts as those of the second embodiment are designated by the same numerals, and the corresponding descriptions similarly apply.

The connecting groove 32a is formed on the inner wall of the sleeve metal 32, and discharges air, which is confined in a space adjacent to a space 32' of the thrust bearing, to the upper end side of the sleeve metal 32. Alternatively, this connecting groove 32a can be formed on the outer wall of the shaft 16. However, in view of the life of the bearing, it is preferable that this connecting groove 32a is formed on the inner wall to the sleeve metal 32 which is of softer material than the shaft 16.

FIFTH EXAMPLE

Figure 5:
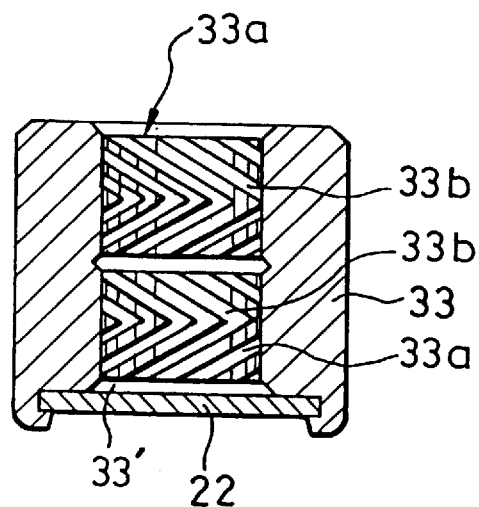
FIG. 5(a) is a partially sectional view showing a bearing of a fifth embodiment of a spindle motor in accordance with the present invention.
FIG. 5(b) is a partially cutaway view, which is a transverse cross section of FIG. 5(a), showing a radial bearing of the fifth embodiment of the spindle motor in accordance with the present invention.
Figure 5:
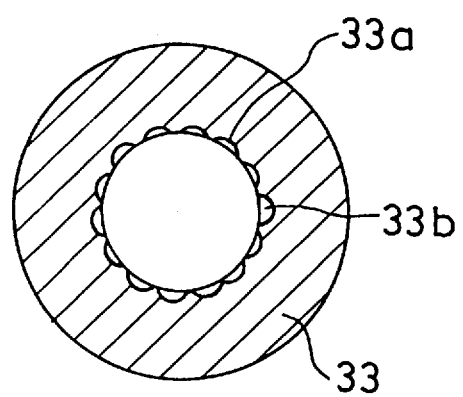

FIG. 5(a) and FIG. 5(b) show a bearing of a spindle motor which is a fifth embodiment of the invention. This is an example in which herringbone-pattern grooves 33a, 33b is used as a connection groove for discharging air. In FIG. 5(a) and FIG. 5(b), the same components and parts as those of the first embodiment are designated by the same numerals and the corresponding descriptions similarly apply.

In this embodiment, the herringbone-pattern grooves 33a are formed on the inner wall side of a sleeve metal 33. A groove 33b of the herringbone-pattern groves 33a is formed deeper so as to make air pass easily than other grooves of the herringbone-pattern grooves 33a. By this configuration, a space 33' of the thrust bearing part is connected to outside open space of the upper end side of the sleeve metal 33.

SIXTH EXAMPLE

Figure 6:
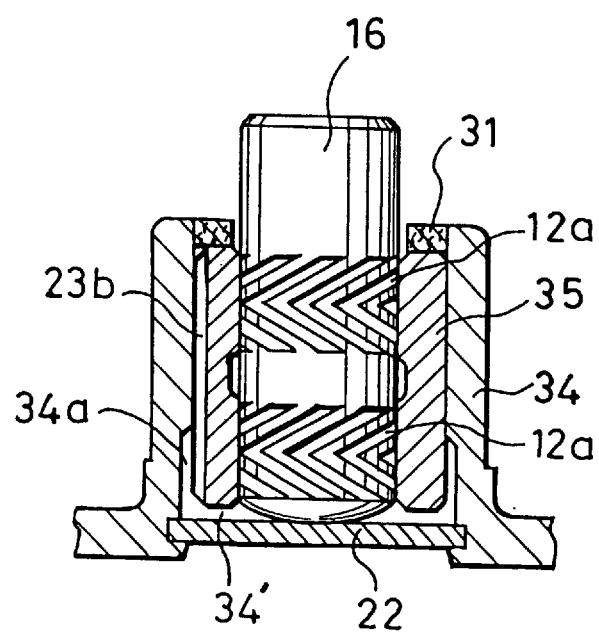
FIG. 6(a) is a partially sectional view showing a bearing of a sixth embodiment of a spindle motor in accordance with the present invention.
FIG. 6(b) is a partially cutaway view, which is a transverse cross section of FIG. 6(a), showing a radial bearing of the sixth embodiment of the spindle motor in accordance with the present invention.
Figure 6:
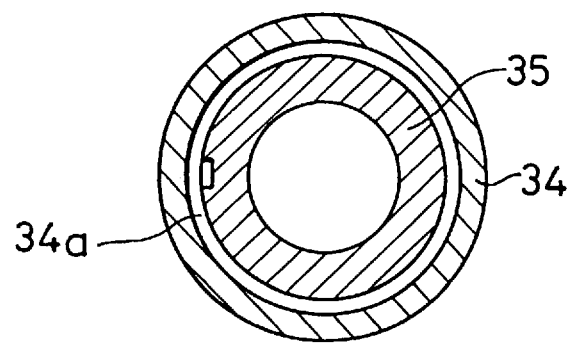
Figure 7A:
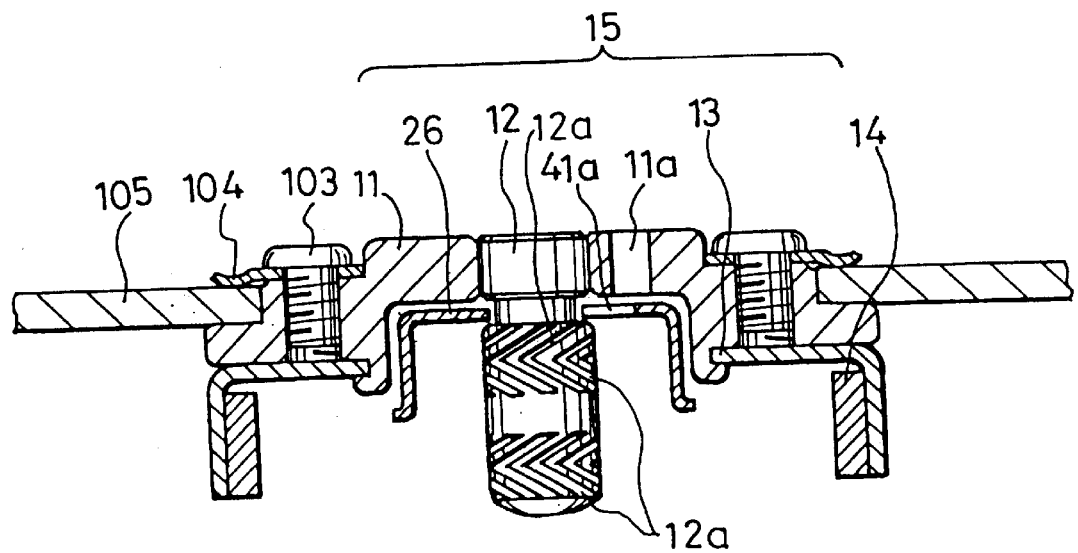
FIG. 7(a) is a sectional view showing an upper assembly of a seventh embodiment of a spindle motor in accordance with the present invention.
Figure 7B:
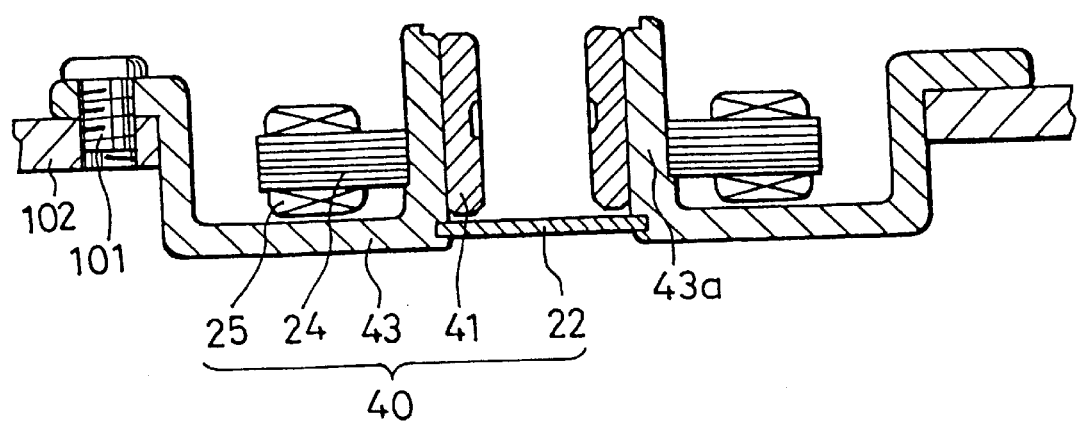
FIG. 7(b) is a sectional view showing a lower assembly of the seventh embodiment of the spindle motor in accordance with the present invention.
Figure 7C:
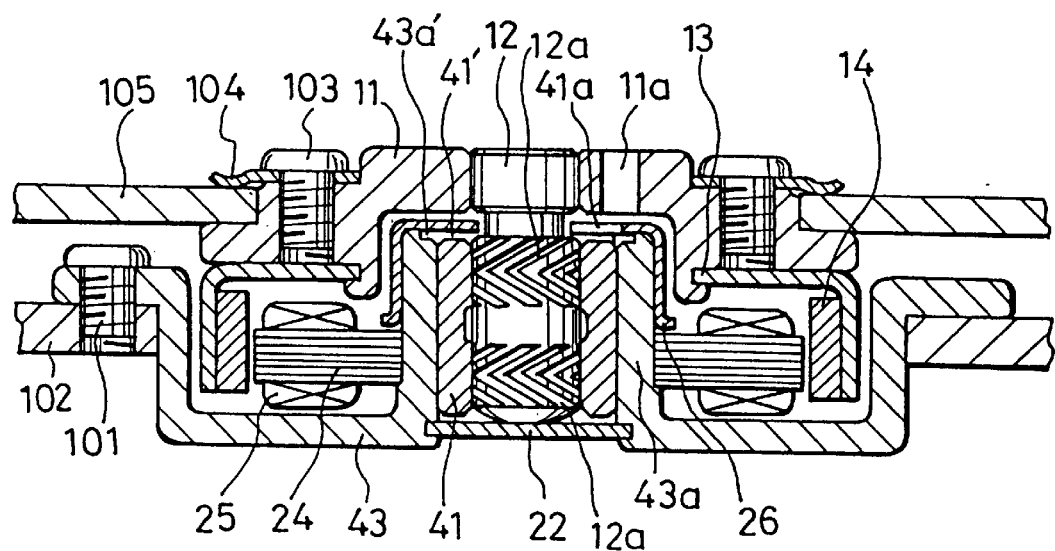
FIG. 7(c) is a sectional view showing the seventh embodiment of a constitution of the spindle motor in accordance with the present invention.
Figure 7D:
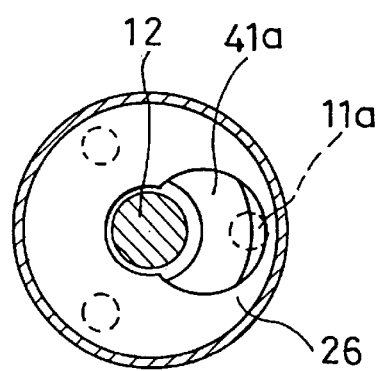
FIG. 7(d) is a partially cutaway view, which is a transverse cross section of FIG. 7(a), showing a radial bearing of the seventh embodiment of the spindle motor in accordance with the present invention.

FIG. 6(a) and FIG. 6(b) show a bearing of a spindle motor which is a sixth embodiment of the invention. This shows an example having a gap 34a around the thrust bearing so as to lengthen the life of the bearing by means of storing more lubricant. In FIG. 6(a) and FIG. 6(b), the same components and parts as those of the third embodiment are designated by the same numerals and the corresponding descriptions similarly apply. The thrust plate 22 is fixed on the lower end of a housing 34, and a sleeve metal 35 is fixed on the inner wall of the housing 34. This gap 34a is formed adjacent to a space 34' of the thrust bearing between the sleeve metal 35 and the housing 34. By this configuration, it is possible that the gap 34a stores more the lubricant.

SEVENTH EXAMPLE

FIG. 7(a)–FIG. 7(d) show a spindle motor with a part of a circumferential motor apparatus which is a seventh embodiment of the invention. This embodiment belongs to the aforementioned second group, which does not have a positive discharge system of air, wherein the lubricant is filled in a gap 41 of an upper end side 41a of a sleeve metal 41 after the insertion of the shaft 12. In FIG. 7(a)–FIG. 7(d), the same components and parts as those of the first embodiment is designated by the same numerals, and the corresponding descriptions similarly apply. This seventh embodiment is similar to the first embodiment, however, way of injecting the lubricant into the gap of the sleeve metal 41 is different between both embodiments.

The assembling method of a lower assembly 40 is the same as the first embodiment, however, the component parts are somewhat different from the first embodiment. A bracket 43 forms a larger reservoir space 43a', which is connected to the gap 41' of the upper end side 41a of the sleeve metal 41, for storing the lubricant on the upper end of a housing 43a, dispensing with a connecting groove. Since the upper assembly 15 is the same as the first embodiment, explanation on the upper assembly 15 is omitted here.

After respective assemblings of the lower assembly 40 and the upper assembly 15, the lower end side of the shaft 12 of the upper assembly 15 is inserted into the sleeve metal 41 of the lower assembly 40. Then, in the same way as the first embodiment, the cap 26 can be by smoothly pushed so that the lower face of the top part of the cap 26 touches the upper end of the housing 43a, when the upper face of the top part of the cap 26 is pushed down by a pushrod (not shown) which is to be inserted downwards through three holes 11a on the hub 11 for assembling work. Hereafter, a predetermined quantity of the lubricant is filled in a gap 41' of the upper end side 41a of the sleeve metal 41 from three ports 11a on the hub 11.

Subsequently, the spindle motor is placed once under the condition of negative pressure by means of putting in a vacuuming chamber, and the condition of negative pressure changes the condition of atmospheric pressure again. Thereby, air in a bearing gap is replaced by the lubricant. Thus, the assembling of the whole spindle motor is worked up.

Alternatively, the lubricant may be filled in the gap 41' of the upper end side 41a of the sleeve metal 41 before the insertion of the upper assembly 15. Further, when the lubricant is stored in the bearing gap, alternatively, it is possible to use capillary action by rising circumferential temperature and decreasing viscosity of the lubricant.

EIGHTH EXAMPLE

Figure 8:
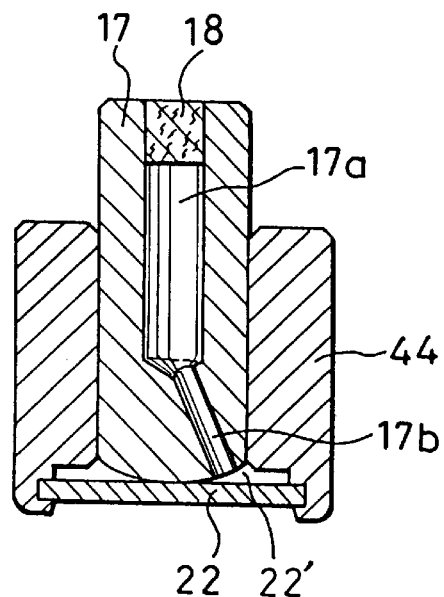
FIG. 8 is a partially sectional view showing a bearing of an eighth embodiment of a spindle motor in accordance with the present invention.

FIG. 8 shows a bearing of a spindle motor which is an eighth embodiment of the invention. This embodiment belongs to the above-mentioned third group, wherein through holes 17a and 17b bored in a shaft 17 is made for discharging air from the thrust bearing part to outside open space. In FIG. 8, the same components and parts as those of the first embodiment are designated by the same numerals and the corresponding descriptions similarly apply.

The through hole 17a is bored at the middle part of a shaft 18 along the axis of the shaft 18, and the through hole 17b is bored at the lower part of the shaft 18 in a direction with a predetermined angle against the shaft 18. The lower end of the through hole 17a is joined to the upper end side of the through hole 17b. The lower end side of the through hole 17b is open to the thrust bearing part at the position apart from the central part of bottom of the shaft 17, and the upper end side of the through hole 17a is connected to outside open space through a filter 18. This filter 18 is provided in the upper end side of the through hole 17a, and prevents undesirable contamination by running of the lubricant by passing air only. Thus, these through holes 17a, 17b connect from a closed space 22' of the thrust bearing part to outside open space.

NINTH EXAMPLE

Figure 9:
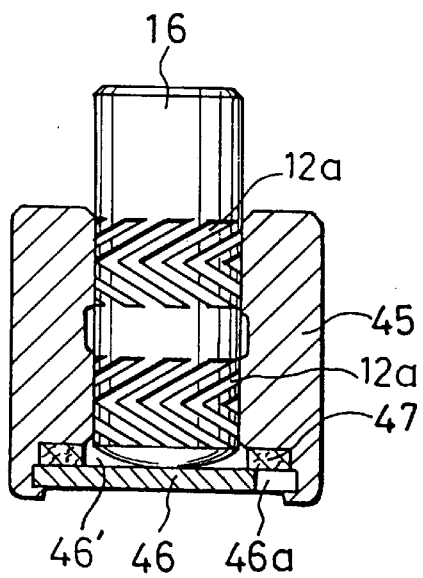
FIG. 9 is a partially sectional view showing a bearing of a ninth embodiment of a spindle motor in accordance with the present invention.

FIG. 9 shows a bearing of a spindle motor which is a ninth embodiment of the invention. This embodiment belongs to the above-mentioned forth group, wherein a ventilation hole 46a provided on a thrust plate 46 is made use for discharging air from the thrust bearing part. In FIG. 9, the same components and parts as those of the second embodiment are designated by the same numerals and the corresponding descriptions similarly apply.

By providing the ventilation hole 46a merely on the end of the thrust plate 46, there is a fear of the leakage of lubricant. Therefore, the filter 47 is provided between the lower end side of a sleeve metal 45 and the upper face of the thrust plate 46 so as to close the ventilation hole 46a. This filter 47 prevents undesirable contamination by running of the lubricant by passing air only as well as that shown in the eighth embodiment.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of assembling a spindle motor for driving a memory disk, the spindle motor comprising a rotor for carrying and driving at least one memory disk; at least one radial type dynamic pressure fluid bearing including a shaft having a first end and a second end, a sleeve having an upper end and a lower end, the sleeve rotatably fitting on the shaft and a first predetermined amount of lubricant between the shaft and the sleeve, either of an outer face of the shaft or an inner face of the sleeve having at least one herringbone-pattern groove for producing dynamic pressure; and a thrust bearing including a thrust plate disposed at the lower end of the sleeve for abutting the first end of the shaft and a second predetermined amount of lubricant confined in a closed space which is formed by the sleeve, the first end of the shaft and the thrust plate, and a gap for storing lubricant at the upper end of the sleeve, the method comprising the steps of:

placing the thrust plate at the lower end of the sleeve, putting lubricant into a space on the upper end of the sleeve, inserting the shaft in the sleeve, and then vacuuming the closed space, thereby sucking the lubricant into the closed space and related space in the bearing, replaced air within the bearing space after the shaft is inserted into the sleeve and the bearing space being placed under a condition of negative pressure.

2. The method of assembling the spindle motor in accordance with claim 1, wherein a predetermined quantity of the lubricant, which is stored in the gap, is injected into the bearing space by raising circumferential temperature thereby decreasing viscosity of the lubricant after insertion of the shaft.

* * * * *